(12) United States Patent
Vargas et al.

(10) Patent No.: US 9,367,875 B2
(45) Date of Patent: *Jun. 14, 2016

(54) MOBILE KIOSK FOR ENHANCED FINANCIAL PRODUCT OFFERINGS

(71) Applicant: BANK OF AMERICA CORPORATION, Charlotte, NC (US)

(72) Inventors: Angel A. Vargas, Charlotte, NC (US); Matthew Laine Donlan, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,380

(22) Filed: Jan. 4, 2016

(65) Prior Publication Data

US 2016/0117767 A1 Apr. 28, 2016

Related U.S. Application Data

(63) Continuation of application No. 14/448,568, filed on Jul. 31, 2014.

(51) Int. Cl.
*G07F 19/00* (2006.01)
*G06Q 40/02* (2012.01)

(52) U.S. Cl.
CPC .................... *G06Q 40/02* (2013.01)

(58) Field of Classification Search
CPC ...... G06F 19/20; G06F 7/201; G06Q 20/1085
USPC .......................................... 235/379
See application file for complete search history.

(56) References Cited

U.S. PATENT DOCUMENTS

| | | | |
|---|---|---|---|
| 4,650,977 | A | 3/1987 | Couch |
| 5,513,117 | A | 4/1996 | Small |
| 6,243,687 | B1 | 6/2001 | Powell |
| 7,748,619 | B2 | 7/2010 | Martin et al. |
| 7,828,646 | B2 | 11/2010 | Franks, Jr. |
| 8,024,272 | B2 | 9/2011 | Doran et al. |
| 8,332,313 | B2 | 12/2012 | Doran et al. |
| 2007/0125620 | A1 | 6/2007 | Sorenson et al. |
| 2007/0272743 | A1 | 11/2007 | Christie et al. |
| 2009/0108015 | A1 | 4/2009 | Kreamer |
| 2011/0184865 | A1 | 7/2011 | Mon et al. |

FOREIGN PATENT DOCUMENTS

| | | |
|---|---|---|
| WO | EP0897042 | 8/1998 |
| WO | WO03/023565 | 9/2002 |
| WO | WO2004019155 | 7/2004 |

*Primary Examiner* — Karl D Frech
(74) *Attorney, Agent, or Firm* — Michael A. Springs

(57) ABSTRACT

A mobile kiosk includes a vehicle and a kiosk portion coupled to the vehicle. The mobile kiosk receives information for a first configuration of financial products, the first configuration determined according to a first vendor. It applies the first configuration to the mobile kiosk and provisions a first set of the financial products while the mobile kiosk is configured according to the first configuration. The mobile kiosk receives information for a second configuration of the financial products, the second configuration determined according to a second vendor, wherein the second configuration differs from the first configuration and the second vendor differs from the first vendor. It applies the second configuration to the mobile kiosk, and provisions a second set of the financial products while the mobile kiosk is configured according to the second configuration.

20 Claims, 5 Drawing Sheets

MOBILE KIOSK FOR ENHANCED FINANCIAL PRODUCT OFFERINGS

RELATED APPLICATION

This application is a continuation of pending U.S. patent application Ser. No. 14/448,568 filed Jul. 31, 2014.

TECHNICAL FIELD OF THE INVENTION

This invention relates generally to kiosks, and more particularly to a mobile kiosk for enhanced financial product offerings.

BACKGROUND

Automatic Teller Machines (ATMs) provide bank customers with the ability to deposit cash or a checks into a bank account and to withdraw cash from the bank account. In some situations, an ATM can be loaded on a truck. For example, if severe weather has caused power outages, road blockages, or other damage that make it difficult for people to access their bank accounts, an ATM can be driven to the site of the severe weather to provide the bank customers with basic access to cash.

SUMMARY

In some embodiments, a mobile kiosk includes a vehicle and a kiosk portion coupled to the vehicle. The mobile kiosk provisions financial products. The mobile kiosk receives information for a first configuration customized according to a first customer location, applies the first configuration, and provisions a first set of the financial products using the first configuration. The mobile kiosk then receives information for a second configuration customized according to a second customer location, applies the second configuration, and provisions a second set of the financial products using the second configuration. The second configuration differs from the first configuration and the second location differs from the first location.

Certain embodiments of the present disclosure may provide one or more technical advantages. In some embodiments, a mobile kiosk customizes product offerings to users in a particular customer location. Customization may allow for deepening relationships with customers and creating unique sales opportunities for experience-oriented, affinity-branded products. In some embodiments, the mobile kiosk provides a robust set of features, like those provided by a banking center and beyond the basic deposit and withdrawal features of an ATM, and also provides convenience and accessibility by traveling to customer locations.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
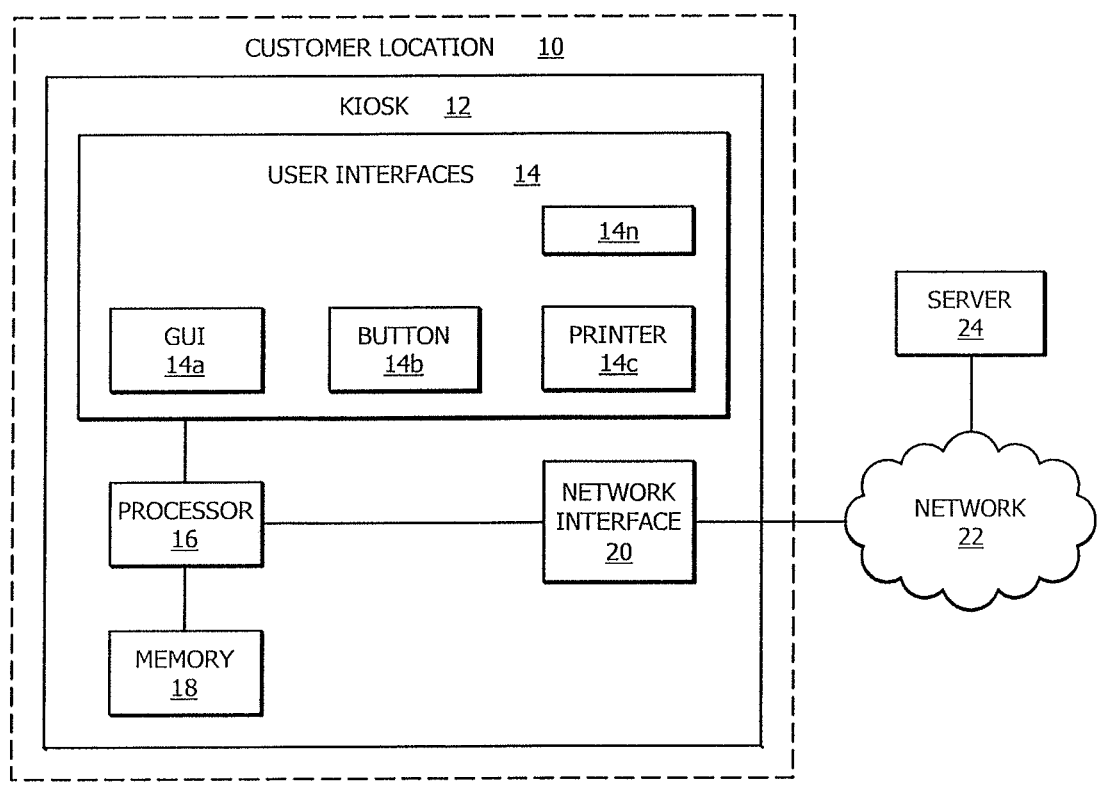
FIG. 1 illustrates a block diagram of a system comprising a kiosk.

FIG. 1 illustrates a block diagram of a system 5 comprising a kiosk 12, network 22, and server 24. In some embodiments, kiosk 12 is a multi-purpose/multi-tenant kiosk. Kiosk 12 offers financial products to users on behalf of a number of vendors. Users interact with kiosk 12 to provision the financial products for a variety of purposes, such as to print a replacement credit card or debit card (e.g., to replace a lost or stolen card associated with an existing account), to open a new account and print a card for the new account in real time (e.g., print a new credit card, debit card, or affinity card), and/or other suitable purpose.

Figure 4:
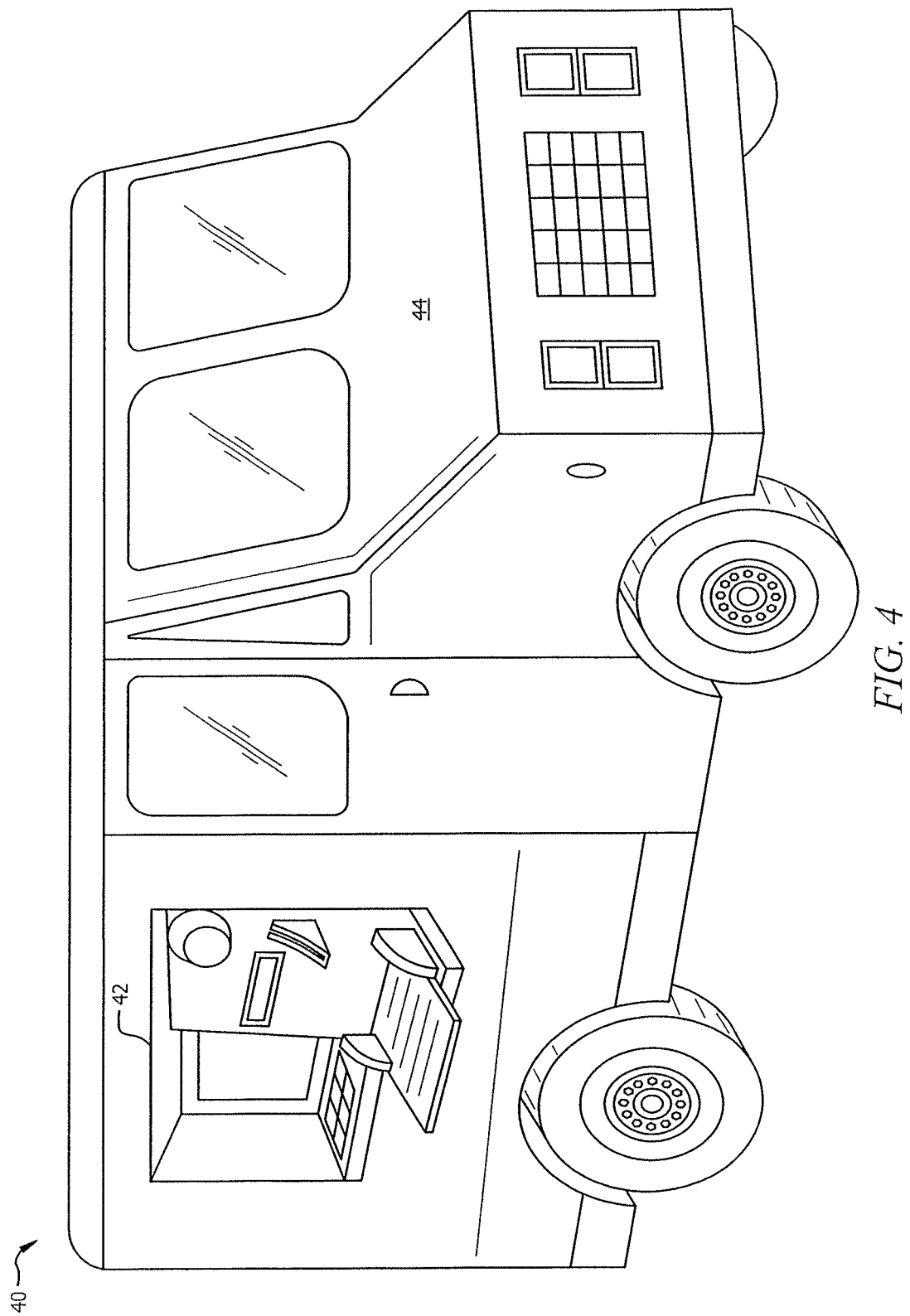
FIG. 4 illustrates an example of a mobile kiosk.

Kiosk 12 refers to a machine deployed at a customer location 10. Examples of customer locations include travel venues (e.g., airports, subway stations, train stations, bus stations, etc.), retail venues (e.g., grocery stores, clothing stores, electronics stores, sporting goods stores, superstores, etc.), entertainment venues (e.g., sporting arenas or other sporting venues, concerts, theaters, restaurants, etc.), and banking centers. Customer location 10 can include an indoor area (such as the lobby inside a store) and/or an outdoor area (such as a parking lot adjacent to the store or other venue). Kiosk 12 may be deployed at customer location 10 on a fixed basis or on a temporary (or periodic) basis. FIG. 4 below describes an example of a kiosk 12 situated on/in a vehicle that travels to a particular customer location on a temporary and/or periodic basis.

Kiosk 12 includes one or more user interfaces 14, processors 16, memories 18, and network interfaces 20. A user interacts with kiosk 12 via the user interface(s) 14. An interface receives input, sends output, processes the input and/or output and/or performs other suitable operations. An interface may comprise hardware and/or software. Examples of user interfaces 14 include one or more graphical user interfaces (GUIs) 14a, buttons 14b, printers 14c, and/or any other suitable user interfaces, such as a microphone, speakers, credit card reader, check reader, user device interface (e.g., a wireless or wired connection where the user connects his or her mobile phone or other user device to kiosk 12), and so on.

Kiosk 12 displays GUI 14a on a display screen. GUI 14a allows a user to access applications of kiosk 12. GUI 14a is generally operable to tailor and filter data entered by and presented to the user. GUI 14a may provide the user with an efficient and user-friendly presentation of information using a plurality of displays having interactive fields, pull-down lists, and buttons operated by the user. GUI 14a may include multiple levels of abstraction including groupings and boundaries. It should be understood that the term GUI 14a may be used in the singular or in the plural to describe one or more GUIs 14a in each of the displays of a particular GUI 14a. The one or more buttons 14b of kiosk 12 may be arranged in a keyboard, a keypad, a touchscreen (e.g., as part of GUI 14a), or other suitable configuration. Printer 14c may be configured to provide any suitable physical output to the user. For example, printer 14c may print a paper receipt describing the user's interaction with kiosk 12. As another example, printer 14c may print a card, such as a plastic credit card, debit card, or affinity card provisioned by kiosk 12.

Processor 16 communicatively couples to user interface 14, memory 18, and network interface 20, and controls the operation and administration of authentication kiosk 12 by processing information received from user interface 14, memory 18, and network interface 20. Processor 16 includes any hardware and/or software that operates to control and process information. For example, processor 16 executes logic to control the operations of kiosk 12. Processor 16 may be a programmable logic device, a microcontroller, a microprocessor, any suitable processing device, or any suitable combination of the preceding.

Memory 18 stores, either permanently or temporarily, data, operational software, or other information for processor 16. Memory 18 includes any one or a combination of volatile or non-volatile local or remote devices suitable for storing information. For example, memory 28 may include Read Only Memory ("ROM"), Random Access Memory ("RAM"), magnetic storage devices, optical storage devices, or any other suitable information storage device or a combination of these devices.

Memory 18 may include any suitable logic for use in the operation of kiosk 12. Logic generally refers to rules, algorithms, code, tables, and/or other suitable instructions embodied in a non-transitory, computer-readable storage medium for performing the described functions and operations. For example, logic facilitates communicating financial products that various vendors offer via kiosk 12, receiving user input indicating a selection of one of the financial products and one of the vendors to provide the financial product, and provisioning the financial product.

Network interface 20 represents any suitable component operable to receive information from network 22, transmit information through network 22, perform processing of information, communicate with other devices, or any combination of the preceding. Network interface 22 represents any port or connection, real or virtual, including any suitable hardware and/or software, including protocol conversion and data processing capabilities, to communicate through a LAN, WAN, or other communication system that allows processor 16 to exchange information with network 22, server 24, and/or other devices of system 5.

Network 22 represents any suitable network operable to facilitate communication between the components of system 5, such as kiosk 12 and server 24. Network 22 may include any interconnecting system capable of transmitting audio, video, signals, data, messages, or any combination of the preceding. Network 22 may include all or a portion of a public switched telephone network (PSTN), a cellular network, a base station, a gateway, a public or private data network, a LAN, a MAN, a WAN, a WWAN, a local, regional, or global communication or computer network, such as the Internet, a wireline or wireless network, an enterprise intranet, or any other suitable communication link, including combinations thereof, operable to facilitate communication between the components.

In some embodiments, kiosk 12 communicates with server 24 to provision the selected financial product. Server 24 may be associated with the vendor of the selected financial product. For example, if the user interacts with kiosk 12 to select Bank A as the vendor of a new credit card account, kiosk 12 may communicate with server 24 associated with Bank A to obtain approval for the new credit card account. In some embodiments, server 24 determines whether additional information is required to provision the new credit card account, determines what additional information to receive from the user, communicates the additional information to the user via kiosk 12, and completes approval of the user to allow the user to open the account. Server 24 may include a network server, any suitable remote server, a mainframe, a host computer, a workstation, a web server, a personal computer, a file server, or any other suitable device operable to communicate with kiosk 12. In some embodiments, server 24 may execute any suitable operating system such as IBM's zSeries/Operating System (z/OS), MS-DOS, PC-DOS, MAC-OS, WINDOWS, UNIX, OpenVMS, Android™, or any other appropriate operating system, including future operating systems. The functions of server 24 may be performed by any suitable combination of one or more servers or other components at one or more locations. Server 24 may include any suitable component, such as one or more network interfaces, processors, and memories.

In an exemplary embodiment of operation, processor 16 of kiosk 12 determines that a user has requested to provision a financial product. For example, processor 16 may optionally receive a signal from user interface 14 indicating that the user pressed a start button and/or that the user entered login credentials to use kiosk 12. In response, processor 16 retrieves a financial product provisioning application from memory 18. The application may include logic and/or rules for provisioning a financial product. In some embodiments, the financial product provisioning application includes information describing financial products that kiosk 12 can provision and vendors that offer the financial products. Upon execution of the financial product provisioning application, processor 16 communicates financial product and vendor offerings to the user, for example, via GUI 14a. Processor 16 then receives input from the user indicating the user's selected financial product and vendor. As an example, the user may select to open a new credit card account with Bank A, to replace a lost debit card associated with an account that the user maintains with Bank B, or to renew a membership account with superstore C. Processor 16 then provisions the selected financial product on behalf of the selected vendor.

For certain financial products and/or vendors, the financial provisioning application may allow kiosk 12 to provision the financial product independently of any communication with the vendor. As an example, kiosk 12 may include an interface where a user deposits cash and, in response, kiosk 12 prints out a prepaid card (e.g., a gift card or other stored value card) having the corresponding cash value. For other financial products and/or vendors, the financial provisioning application may include rules whereby processor 16 communicates with the vendor to approve the provisioning. As an example, the rules may require processor 16 to communicate with a server 24 associated with Bank A in order to obtain approval for opening a new credit card account with Bank A. Additional examples of functionality that may be performed by the components of kiosk 12 are described below.

Figure 2:
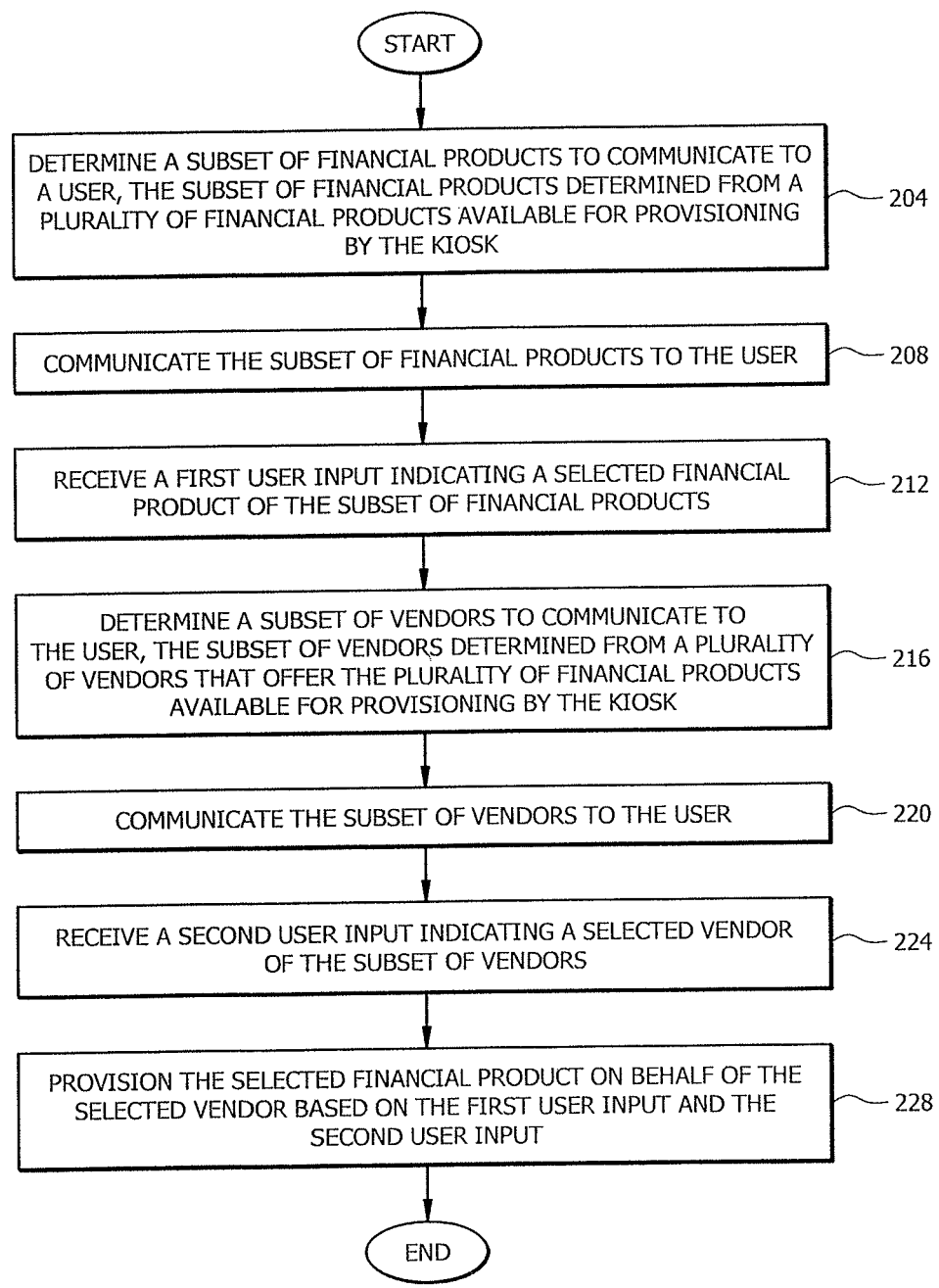
FIG. 2 illustrates an example flowchart for a multi-purpose, multi-tenant kiosk.

FIG. 2 illustrates an example flowchart 200 for a method in kiosk 12 deployed at a customer location, such as a travel venue (e.g., airport, subway station, train station, bus station, etc.), a retail venue (e.g., grocery store, clothing store, electronics store, sporting goods store, superstore, etc.), entertainment venue (e.g., sporting arena or other sporting venue, concert, theater, restaurant, etc.), or a banking center.

Kiosk 12 may be multi-purpose in that it offers a plurality of financial products having various purposes. Examples of financial products include credit accounts, debit accounts, prepaid accounts (e.g., gift cards, stored value cards), and affinity accounts. An affinity account may refer a membership account and/or a rewards account with a particular vendor. For example, a user may purchase a membership account with a retail superstore in order to shop in the store. As another example, a user may enroll in a rewards account with an airline in order to obtain points, discounts, or other loyalty incentives from the airline. Kiosk 12 may also serve other purposes, such as allowing bill pay. For example, a user may a phone bill, an electric bill, or other bill into kiosk 12 and may then deposit cash in order to pay the bill. In some embodiments, kiosk 12 may include ATM functionality, such as accepting deposits and withdrawals from a bank account.

Kiosk 12 may be multi-tenant in that it offers the financial products on behalf of a variety of vendors. For example, one or more financial institutions, one or more retailers, and other suitable vendors may all offer financial products via kiosk 12.

At step 204, kiosk 12 determines a subset of financial products to communicate to a user. The subset of financial products is determined from the plurality of financial products available for provisioning by kiosk 12. The subset of financial products may include one, some, or all of the plurality of financial products that kiosk 12 is capable of provisioning. To determine the subset of financial products, kiosk 12 may apply a pre-defined rule, such as a rule to always offer all the financial products or a rule to only offer financial products of interest to the user based on a user profile. In addition (or in the alternative), kiosk 12 may determine the subset of financial products based on a request from the user. As an example, the user may request to see all of the financial products that kiosk 12 can provision. Or, the user may request to see only the financial products that kiosk 12 can provision on behalf of a particular vendor (which may be fewer than all of the financial products that kiosk 12 is capable of provisioning).

At step 208, kiosk 12 communicates the subset of financial products to the user. In some embodiments, kiosk 12 communicates the financial products to the user via a display screen depicting GUI 14a. In response to seeing the available financial products, the user may submit a first user input indicating a selected financial product. For example, the user may interact with user interface 14, such as a touchscreen, to select the financial product. At step 212, kiosk 12 receives the first user input indicating the selected financial product.

At step 216, kiosk 12 determines a subset of vendors to communicate to the user. The subset of vendors is determined from a plurality of vendors that offer the financial products available for provisioning by kiosk 12. The subset of vendors may include one, some, or all of the plurality of vendors that offer financial products via kiosk 12. To determine the subset of vendors, kiosk 12 may apply a pre-defined rule, such as a rule to always offer all the vendors or a rule to only offer vendors of interest to the user based on a user profile. In addition (or in the alternative), kiosk 12 may determine the subset of vendors based on a request from the user. As an example, the user may request to see all of the vendors that offer financial products via kiosk 12. Or, the user may request to see only the vendors that offer particular financial products, such as affinity accounts, which may be fewer than all of the vendors that kiosk 12.

At step 220, kiosk 12 communicates the subset of vendors to the user. In some embodiments, kiosk 12 communicates the vendors to the user via a display screen depicting GUI 14a. In response to seeing the available vendors, the user may submit a second user input indicating a selected vendor. For example, the user may interact with user interface 14, such as a touchscreen, to select the vendor. At step 224, kiosk 12 receives the second user input indicating the selected vendor.

At step 228, kiosk 12 provisions the selected financial product on behalf of the selected vendor based on the first user input and the second user input. As discussed with respect to FIG. 1, in some embodiments kiosk 12 may provision the financial product itself and in other embodiments kiosk 12 may interact with the selected vendor to approve and/or configure the financial product (e.g., by communicating with server 24 associated with the selected vendor via network 22). Provisioning the financial product may include issuing a plastic card (e.g., a card with a magnetic stripe or an embedded radio frequency identifier (RFID)), a token for a mobile device, or other suitable means for facilitating transactions using the selected financial product. Provisioning may also include opening a new account or updating an existing account of the user. Examples of updates to an existing account include renewing an expired membership account or adding funds to a prepaid account (such as an account associated with a gift card). The method then ends.

The steps of method 200 may be combined or separated and may be performed in any suitable order. For example, in some embodiments, kiosk 12 may communicate the subset of vendors to the user prior to communicating the subset of financial products to the user. As another example, in some embodiments, kiosk 12 may communicate the vendors and financial products simultaneously (e.g., one option may be for "Bank A—Credit Account," another option could be for "Bank B—Credit Account," and another option could be for "Store C—Prepaid Account"). As another example, kiosk 12 may receive the first user input and second user input in separate messages or in the same message (the user can submit the selected vendor and the selected financial product at the same time).

Kiosk 12 may include any suitable modules for performing the steps described with respect to FIG. 2. A module may include one or more processors, memory, and/or interfaces. Examples of modules of particular embodiments of kiosk 12 include a financial products selection module that determines a subset of financial products from a plurality of financial products available for provisioning by kiosk 12 and communicates the subset of financial products to a user via a user interface (such as a display screen of kiosk 12), a vendor selection module that determines a subset of vendors from a plurality of vendors that offer the plurality of financial products available for provisioning by the kiosk and communicates the subset of vendors to the user via a user interface (such as a display screen of kiosk 12), and a provisioning module that receives the user's selection of financial product and vendor via a user input interface (such as a touchscreen of kiosk 12) and provisions the selected financial product on behalf of the selected vendor, for example, by configuring an account and printing a card for the account via a user interface (such as a printer of kiosk 12).

Figure 3A:
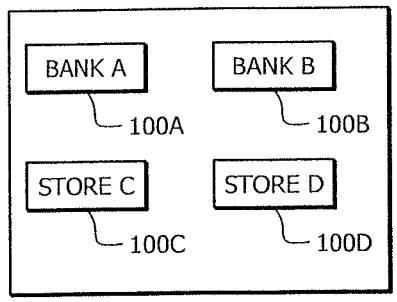
FIGS. 3A-3D illustrate example display screens for a multi-purpose, multi-tenant kiosk.
Figure 3B:
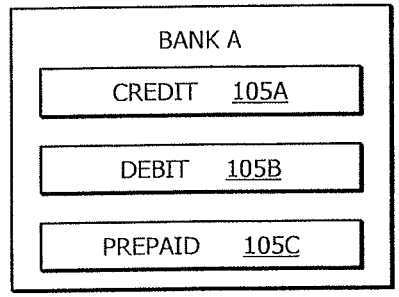

FIGS. 3A-3D illustrate example display screens for a multi-purpose, multi-tenant kiosk 12. FIG. 3A illustrates a display screen of kiosk 12 that presents a plurality of vendors 100 to the user, such as vendor 100A corresponding to Bank A, vendor 100b corresponding to Bank B, vendor 100C corresponding to Store C, and vendor 100D corresponding to Store D. FIG. 3B illustrates an example in which the user selected Bank A as the vendor and the display screen of kiosk 12 presents the user with a plurality of financial products 105A that Bank A offers via kiosk 12. The financial products include a credit account 105A, a debit account 105B, and a prepaid account 105C.

As an example, suppose user selects the credit account 105A. Selecting credit account 105A may allow the user to open a new credit account and obtain a credit card that kiosk 12 prints for the account in real-time. Selecting credit account 105A may allow the user to provision an existing account that the user maintains with Bank A. As an example, if the user's credit card for the existing account has been lost, stolen, or expired, then kiosk 12 may provision the existing account by deactivating the old credit card and activating and printing a replacement card.

Figure 3C:
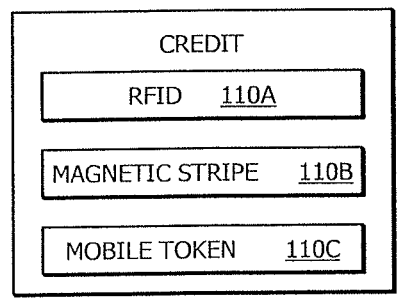

In some embodiments, kiosk 12 communicate a plurality of format options for provisioning the selected financial product, receive a selected format option from the user, and provisions the selected financial product according to the selected format option. For example, FIG. 3C illustrates an example where to provision the credit account described with respect to FIG. 3B, the kiosk presents the user with the format options of a radio frequency identifier (RFID) 110A, a magnetic stripe card 110B, and/or a mobile token 110C for accessing the account from the user's mobile device. The user may select one or more of his or her preferred format options. For example, the user may select to print a credit card with a magnetic stripe and to also provision a mobile token to enable the user to interact with the user's mobile phone or other device in order to perform financial transactions involving the credit account.

Figure 3D:
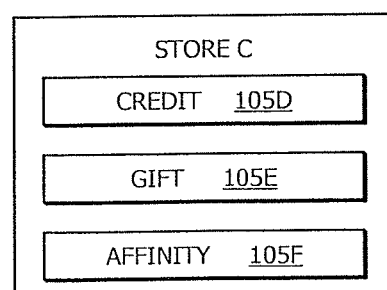

Different vendors 100 may offer different financial products 105. FIG. 3D illustrates an example in which Store C offers different financial products than the credit account 105A, debit account 105B, and prepaid account 105C offered by Bank A (as discussed with respect to FIG. 3B). In the example, Store C offers a credit account 105D, a gift account 105E, and an affinity account 105F. In one embodiment, Store C may be a superstore or other store that requires membership to shop at Store C. Kiosk 12 may be deployed in an entrance or lobby area of Store C. Non-member users may use kiosk 12 to provision membership to Store C (e.g., by selecting affinity account 105F). The users may also use kiosk 12 to obtain a Store C-branded credit cards (e.g., by selecting credit account 105D). The user may also use kiosk 12 to obtain a gift card 105E. The gift card may be funded in any suitable manner, such as by depositing cash into kiosk 12, swiping a credit card or check through a reader on kiosk 12, or interacting with a user interface of kiosk 12 to link to a bank account of the user (e.g., via network 22).

FIG. 4 illustrates an example of a mobile kiosk 40. In some embodiments, mobile kiosk 40 includes a kiosk portion 42 having a user interface 14, a processor 16, memory 18, and a network interface 20 (e.g., a wireless interface) similar to those described with respect to kiosk 12 of FIG. 1. Kiosk portion 14 couples to a vehicle 44, such as a truck, so that mobile kiosk 40 can be moved from one customer location 10 to the next. Components of kiosk portion 42 may be coupled on and/or in vehicle 44 in any suitable manner that allows a user to access user interface 14 when vehicle 44 is parked.

At a given time, mobile kiosk 40 may optionally be configured as multi-tenant and/or multi-purpose, or mobile kiosk 40 may be customized for one particular tenant and/or one particular purpose. Mobile kiosk 40 may be reconfigurable. For example, mobile kiosk 40 may be configured for one purpose when located in a first customer location 10a and reconfigured for another purpose when located in a second customer location 10b.

In some embodiments, mobile kiosk 40 may provide features similar to those provided by an Automatic Teller Machine (ATM), such as dispensing cash and receiving cash or checks for deposit. In addition, mobile kiosk 40 provides an enhanced set of banking features to users. As an example, mobile kiosk 40 deployed at Store A for a grand opening event may offer users the ability to activate and print a membership card, a reward card, or a gift card to Store A. After the grand opening of Store A, mobile kiosk 40 could drive to another customer location. For example, mobile kiosk could drive to a sporting event and could be reconfigured to offer users the ability to open a new credit account and to print a credit card with a logo of one of the teams participating in the sporting event.

Mobile kiosk 40 may provide one or more advantages. In some embodiments, mobile kiosk 40 customizes product offerings to users in a particular customer location. Customization may allow for deepening relationships with customers and creating unique sales opportunities for experience-oriented, affinity-branded products, like selling football-themed credit cards at a football stadium on game day. In some embodiments, mobile kiosk 40 may be likened to a banking center on a truck. Mobile kiosk 40 provides a robust set of features, like those provided by a banking center, and also provides convenience and accessibility by traveling to customer locations. Instead of the user having to make a trip to a banking center on the way to an event, the user can go to the event and transact the user's banking from mobile kiosk 40 located at the event.

Mobile kiosk 40 travels to any suitable locations where people are likely to be engaged in commercial services. As an example, mobile kiosk 40 may travel to store openings where customers can get a new credit relationship or purchase customized store specific gift cards. Mobile kiosk 40 may also travel to the store for seasonal promotions (e.g., winter sale, semi-annual sale) where the store offers cash back, bonus points, discounts, or other incentives for joining an affinity program or opening a new credit account with the store. As another example, mobile kiosk 40 may periodically travel to a company sponsored on-site banking event for which the offerings of mobile kiosk 40 can be tailored to employees of the company and the reason for the event (e.g., deposit a check on payday, open a health savings account during a benefit enrollment period, enroll in a 401K plan during a retirement planning seminar, etc.). As yet another example, mobile kiosk 40 may travel to a university during university sponsored events, such as registration days or during concerts or other on-campus entertainment programs.

Figure 5:
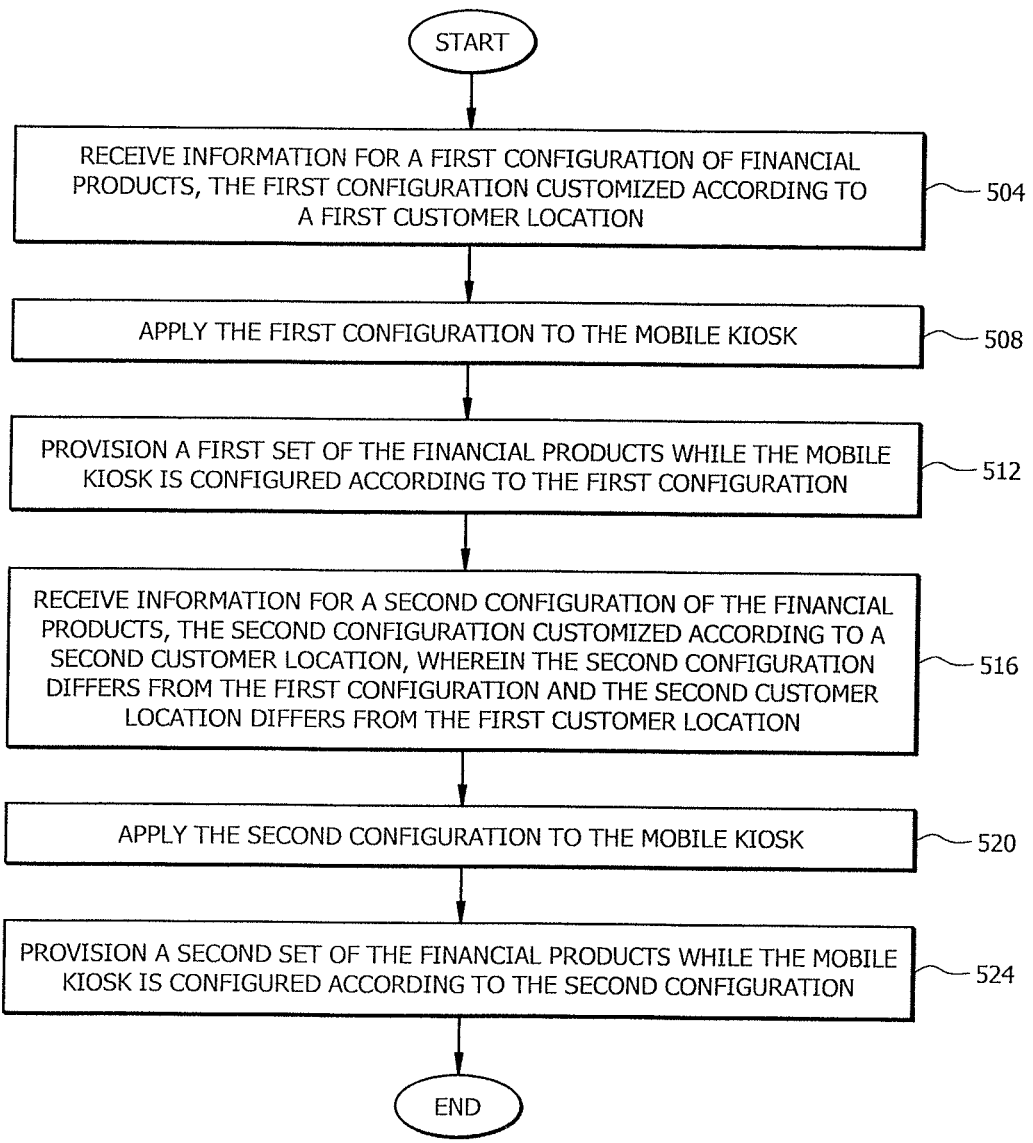
FIG. 5 illustrates an example of a method performed by a mobile kiosk.

FIG. 5 illustrates an example of a method for customizing financial products based on the current location of mobile kiosk 40. At step 504, mobile kiosk receives information for a first configuration of financial products. Mobile kiosk 40 may receive the configuration information in any suitable manner. In some embodiments, mobile kiosk 40 receives the configuration information from an administrator that programs the configuration information through user interface 14 or through messaging over network 22. The first configuration is customized according to a first customer location, such as a travel venue, a retail venue, or an entertainment venue. As an example, the first customer location may correspond to Store A, and the financial products customized to Store A may include a Store A-branded credit account, debit account, prepaid account (such as a gift card account), or affinity account (such as membership or reward card account).

At step 508, the method applies the first configuration to mobile kiosk 40. As a result, mobile kiosk 40 is configured to offer the financial products of the first configuration, such as the Store-A branded products described in the previous step. In some embodiments, mobile kiosk 40 may apply the first configuration in real-time upon receipt of the first configuration information. Alternatively, mobile kiosk 40 may store the first configuration information in memory 18 and apply the first configuration at a later time, such as when mobile kiosk 40 is at or en route to Store A. Mobile kiosk 40 may detect that it is at or en route to Store A based on administrator input or by using location technology, such as a Global Positioning System (GPS). In response to detecting proximity to Store A, mobile kiosk 40 applies the first configuration.

At step 512, the method provisions a first set of the financial products while mobile kiosk 40 is configured according to the first configuration. For example, mobile kiosk 40 located at Store A provisions the Store-A branded products while mobile kiosk 40 is configured according to the first configuration. In some embodiments, provisioning one of the financial products may include printing a card having a magnetic stripe or a radio frequency identifier (RFID). Thus, in some embodiments, a user could print a Store-A branded credit card, debit card, gift card, membership card, reward card, or other similar card in real-time using mobile kiosk 40 located at Store A.

In some embodiments, provisioning financial products may include determining an identity of a current user of mobile kiosk 40 and selecting certain financial products to offer the user based on the customer location and the identity of the current user. For example, mobile kiosk 40 located at Store A may request login information from the current user and may use the login information to access a user profile of the current user. The login information could be a name, password, account number, or other information input by the user by typing on a keyboard or touchscreen, by swiping the user's credit, debit, membership, or other card through a card reader, or by other suitable means. The corresponding user profile could be stored in memory 18 or received via network 22. If the user profile indicates that Customer A already has a membership to Store A, mobile kiosk 40 may determine that it is not necessary to offer Customer A membership to Store A. As another example, mobile kiosk 40 located at a basketball game between Team A and Team B, may determine that the user is a fan of Team A based on the user's profile. Mobile kiosk 40 may then offer Team A branded products instead of Team B branded products.

Continuing to step 516, the method receives information for a second configuration of the financial products. Mobile kiosk 40 may receive the configuration information in any suitable manner. In some embodiments, mobile kiosk 40 receives the configuration information from an administrator that programs the configuration information through user interface 14 or through messaging over network 22. The second configuration is customized according to a second customer location. The second customer location differs from the first customer location. For example, the first location in the example may correspond to Store A and the second location may correspond to a Company B that is hosting an on-site banking day for its employees during a retirement planning seminar.

The second configuration differs from the first configuration. For example, the first configuration in the example offered Store A-branded products. The second configuration could offer enrollment in a 401K plan of Company B. The first configuration and second configuration may be considered to differ if at least one financial product is different. Thus, even if the first configuration and the second configuration in the example both provide ATM services, the second configuration differs from the first configuration because the second configuration offers enrollment in Company B's 401K plan and the first configuration does not.

At step 520, the method applies the second configuration to mobile kiosk 40. As a result, mobile kiosk 40 is configured to offer the financial products of the second configuration, such as the Company B's 401K plan described in the previous step.

In some embodiments, mobile kiosk 40 may apply the second configuration in real-time upon receipt of the second configuration information. Alternatively, mobile kiosk 40 may store the second configuration information in memory 18 and apply the second configuration at a later time, such as when mobile kiosk 40 is at or en route to Company B. Mobile kiosk 40 may detect that it is at or en route to Company B based on administrator input or by using location technology, such as a Global Positioning System (GPS). In response to detecting proximity to Company B, mobile kiosk 40 applies the second configuration.

At step 524, the method provisions a second set of the financial products while mobile kiosk 40 is configured according to the second configuration. For example, mobile kiosk 40 located at Company B provisions enrollment in Company B's 401K plan while mobile kiosk 40 is configured according to the second configuration and located at Company B.

In some embodiments, provisioning financial products may further include determining an identity of a current user of mobile kiosk 40 and selecting certain financial products to offer the user based on the customer location and the identity of the current user. For example, mobile kiosk 40 located at Company B's retirement planning seminar may access a user profile for the current user. The user profile could be located in memory 18 or received via network 22. Mobile kiosk 40 could offer certain investment options to younger users and could offer different investment options for users that are nearing retirement age.

As described above, mobile kiosk 40 may be customized according to a customer location. In the example, the first customer location corresponds to a first vendor (Store A) and the first configuration includes financial products associated with the first vendor (Store A-branded products). The second customer location does not correspond to the first vendor (the second customer location corresponds to Company B, rather than Store A) and the second configuration does not include the financial products associated with the first vendor (the second configuration includes enrollment in Company B's 401K plan rather than Store-A branded products). The ability to customize the financial products offered by mobile kiosk 40 may help to build customer relationships by offering financial products that have a relatively high likelihood of being of interest to customers at a particular customer location.

Certain embodiments of the present disclosure may provide one or more technical advantages. A technical advantage of one embodiment of a multi-purpose/multi-tenant kiosk provides a one-stop shop for provisioning financial products. A multi-purpose kiosk may offer a variety of financial products, such as a credit account, a debit account, a prepaid account, and/or an affinity account. The financial products can be offered in a variety of formats (e.g., magnetic stripe, radio frequency identifier, mobile token). A multi-tenant kiosk may offer financial products from a variety of vendors, such as multiple financial institutions and/or multiple retailers. An advantage of a multi-purpose/multi-tenant kiosk may be the creation of scale to manage the economics of deploying kiosks. For example, as the number of purposes and vendors increases, the volume of transactions that users conduct via the kiosk may tend to increase thereby creating economies of scale. In some embodiments, a technical advantage may provide customers a convenient means for replacing a lost or stolen card. For example, kiosks can be placed in locations where customers are likely to need to replace lost or stolen cards, such as a banking center, a travel venue, a retail venue, or an entertainment venue. In some embodiments, the kiosk can be used by existing customers (e.g., to link to an existing bank account to print a replacement for a lost or stolen card) or prospective customers (e.g., to open a new account and print a card in real time).

In some embodiments, kiosk 12 may allow for adding a gift card to a gift registry. As an example, a couple could provision a gift card and register the gift card in a wedding registry. Friends and relatives of the couple could then make gifts to the couple by adding funds to the registered gift card, which may provide the convenience of allowing multiple gift givers to consolidate their gifts on a single gift card. The gift card could be personalized with a poem, greeting, picture, or other customizations.

In some embodiments, kiosk 12 may have a primary vendor and secondary vendors. The primary vendor may deploy kiosk 12 at the customer location. The secondary vendors may pay the primary vendor to offer financial products using kiosk 12. For example, a secondary vendor may pay the primary vendor a flat fee or a per transaction fee to offer financial products using kiosk 12. In some embodiments, the primary vendor may configure the kiosk with a teller-assist feature, such as a button that the user presses to contact a representative if the user is having difficulty operating kiosk 12. In some embodiments, the representative may be an employee of the primary vendor. In other embodiments, the representative may be an employee of a particular secondary vendor that provides the financial product that the user wishes to provision.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may also be made to the methods disclosed herein without departing from the scope of the invention. The methods may include more, fewer, or other steps. Additionally, steps may be performed in parallel or in any suitable order. Any suitable component may perform one or more steps of the methods disclosed herein.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A mobile kiosk comprising a vehicle and a kiosk portion coupled to the vehicle, the mobile kiosk operable to:
   receive information for a first configuration of financial products, the first configuration determined according to a first vendor;
   apply the first configuration to the mobile kiosk;
   provision a first set of the financial products while the mobile kiosk is configured according to the first configuration;
   receive information for a second configuration of the financial products, the second configuration determined according to a second vendor, wherein the second configuration differs from the first configuration and the second vendor differs from the first vendor;
   apply the second configuration to the mobile kiosk; and
   provision a second set of the financial products while the mobile kiosk is configured according to the second configuration.

2. The mobile kiosk of claim 1, wherein:
   the first vendor is associated with a first customer location; and
   the second vendor is associated with a second customer location.

3. The mobile kiosk of claim 2, wherein the mobile kiosk is further operable to:
   detect when the mobile kiosk is located proximate to the first customer location and apply the first configuration in response; and
   detect when the mobile kiosk is located proximate to the second customer location and apply the second configuration in response.

4. The mobile kiosk of claim 2, wherein the first customer location corresponds to a travel venue, a retail venue, or an entertainment venue.

5. The mobile kiosk of claim 1, wherein at least one of the financial products of the first configuration allows a user to use the mobile kiosk to open a credit account, a debit account, a prepaid account, or an affinity account.

6. The mobile kiosk of claim 1, wherein at least one of the financial products of the first configuration allows a user to use the mobile kiosk to print a card having a magnetic stripe or a radio frequency identifier (RFID).

7. The mobile kiosk of claim 1, wherein the mobile kiosk is further operable to determine an identity of a current user of the mobile kiosk and select certain financial products to include or exclude from the first set of financial products based at least in part on the identity of the current user.

8. Non-transitory computer readable medium comprising logic, the logic, when executed by a processor, operable to:
   receive information for a first configuration of financial products, the first configuration determined according to a first vendor;
   apply the first configuration to the mobile kiosk;
   provision a first set of the financial products while the mobile kiosk is configured according to the first configuration;
   receive information for a second configuration of the financial products, the second configuration determined according to a second vendor, wherein the second configuration differs from the first configuration and the second vendor differs from the first vendor;
   apply the second configuration to the mobile kiosk; and
   provision a second set of the financial products while the mobile kiosk is configured according to the second configuration.

9. The medium of claim 8, wherein:
   the first vendor is associated with a first customer location; and
   the second vendor is associated with a second customer location.

10. The medium of claim 9, wherein the logic is further operable to:
    detect when the mobile kiosk is located proximate to the first customer location and apply the first configuration in response; and
    detect when the mobile kiosk is located proximate to the second customer location and apply the second configuration in response.

11. The medium of claim 9, wherein the first customer location corresponds to a travel venue, a retail venue, or an entertainment venue.

12. The medium of claim 8, wherein at least one of the financial products of the first configuration allows a user to use the mobile kiosk to open a credit account, a debit account, a prepaid account, or an affinity account.

13. The medium of claim 8, wherein at least one of the financial products of the first configuration allows a user to use the mobile kiosk to print a card having a magnetic stripe or a radio frequency identifier (RFID).

14. The medium of claim 8, wherein the logic is further operable to determine an identity of a current user of the mobile kiosk and select certain financial products to include or exclude from the first set of financial products based at least in part on the identity of the current user.

15. A method performed by a mobile kiosk, the method comprising:
   receiving information for a first configuration of financial products, the first configuration determined according to a first vendor;
   applying the first configuration to the mobile kiosk;
   provisioning a first set of the financial products while the mobile kiosk is configured according to the first configuration;
   receiving information for a second configuration of the financial products, the second configuration determined according to a second vendor, wherein the second configuration differs from the first configuration and the second vendor differs from the first vendor;
   applying the second configuration to the mobile kiosk; and
   provisioning a second set of the financial products while the mobile kiosk is configured according to the second configuration.

16. The method of claim 15, wherein:
   the first vendor is associated with a first customer location; and
   the second vendor is associated with a second customer location.

17. The method of claim 16, further comprising:
   detecting when the mobile kiosk is located proximate to the first customer location and apply the first configuration in response; and
   detecting when the mobile kiosk is located proximate to the second customer location and apply the second configuration in response.

18. The method of claim 15, wherein at least one of the financial products of the first configuration allows a user to use the mobile kiosk to open a credit account, a debit account, a prepaid account, or an affinity account.

19. The method of claim 15, wherein at least one of the financial products of the first configuration allows a user to use the mobile kiosk to print a card having a magnetic stripe or a radio frequency identifier (RFID).

20. The method of claim 15, further comprising determining an identity of a current user of the mobile kiosk and selecting certain financial products to include or exclude from the first set of financial products based in part on the identity of the current user.

\* \* \* \* \*